Feb. 14, 1928.
H. E. GOODENOW
1,659,428
CLUTCH
Filed March 17, 1927   2 Sheets-Sheet 1
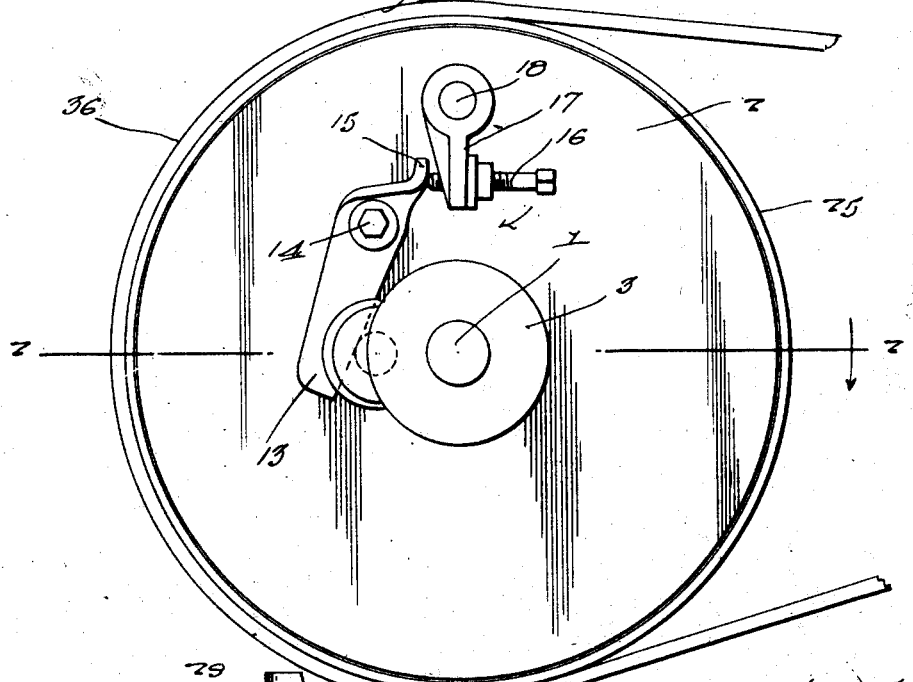
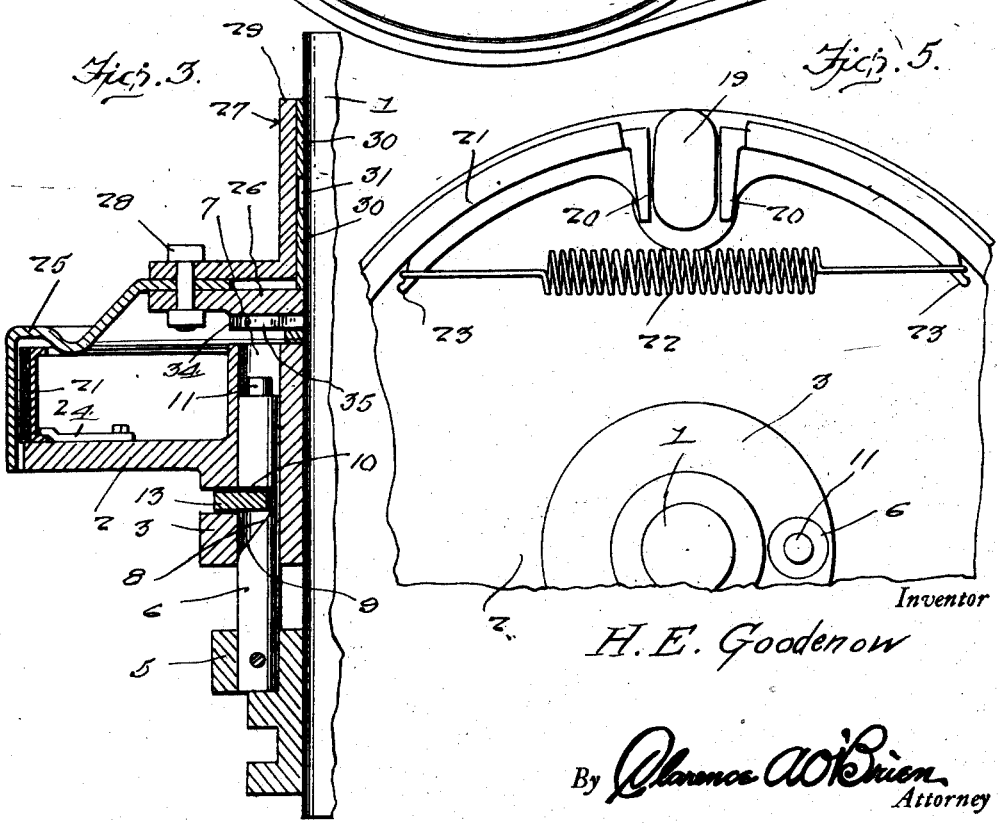
Inventor
H. E. Goodenow
By Clarence A. O'Brien
Attorney Feb. 14, 1928.

H. E. GOODENOW 1,659,428

CLUTCH

Filed March 17, 1927   2 Sheets-Sheet 2

Inventor
H. E. Goodenow

By Clarence A. O'Brien
Attorney

Patented Feb. 14, 1928.

1,659,428

UNITED STATES PATENT OFFICE.

HARRY E. GOODENOW, OF WINTER HAVEN, FLORIDA.

CLUTCH.

Application filed March 17, 1927. Serial No. 176,066.

This invention relates to a clutch more particularly adapted for use in transmitting and controlling power between a main drive shaft and a machine structure which it is desired to operate intermittently.

An object of the invention is to provide a clutch having a single control lever adapted for operating a single engaging mechanism which will primarily operate to frictionally engage a suitable member driven by a source of power and forming the driving member for the machine, so as to gradually start the operation of the machine in which the difference in motion between the driving means and the driven means for the machine is taken up in the clutch structure, until the operation of the driven means on the machine attains substantially the same speed as the driving means, at which time mechanism is provided for operation to rigidly connect the driving and driven means for the normal operation of the machine.

A further object of the invention is to embody in a clutch construction, a suitable starting mechanism for a machine to be driven from a main drive shaft or other suitable continuously operating power supply means, a suitable friction engaging mechanism operable by the same lever and in the same operation as the clutch pin for locking the parts of the clutch in rigid driving connection which will provide a smooth and even starting for the machine until it attains its normal speed of operation when the continued movement of the clutch lever and clutch pin locks the driving and driven members for the normal driving operation, and in which the parts cooperate to normally prevent the accidental disengagement of the clutch pin from its associated clutch element.

The invention more particularly comprehends the provision of a clutch pin operable in a driven member which is adapted to operate suitable friction engaging means for the driving member to provide the necessary starting of the driven machine in a smooth and even manner for obtaining the normal operation of the machine in advance of clutching the driving and driven members so as to relieve unnecessary strains on the clutch pin in rigidly engaging between these driving and driven members for the normal driving operation of the machine in which the mechanism operating the clutch engaging elements controls the operation of the clutch pin, in a predetermined manner.

The invention comprehends numerous other objects residing in the specific details of construction and relation of parts which are more particularly pointed out in the following detailed description and claims directed to a preferred form of the invention, it being understood however, that various changes in the size, shape, and relation of the parts may be made without departing from the spirit and scope of the invention as herein set forth.

In the drawings forming part of this application:—

Figure 1 is an end elevation of the improved clutch structure of this invention showing the operating mechanism for the friction band.

Fig. 3 is a view similar to Fig. 2, in which the right hand portion of the view is broken away, and illustrating the parts in the disengaged relation.

Fig. 5 is an inside elevational view of the portion of the disk member forming part of the driven assembly, showing the mounting and operating structure for the friction band.

Figure 2:
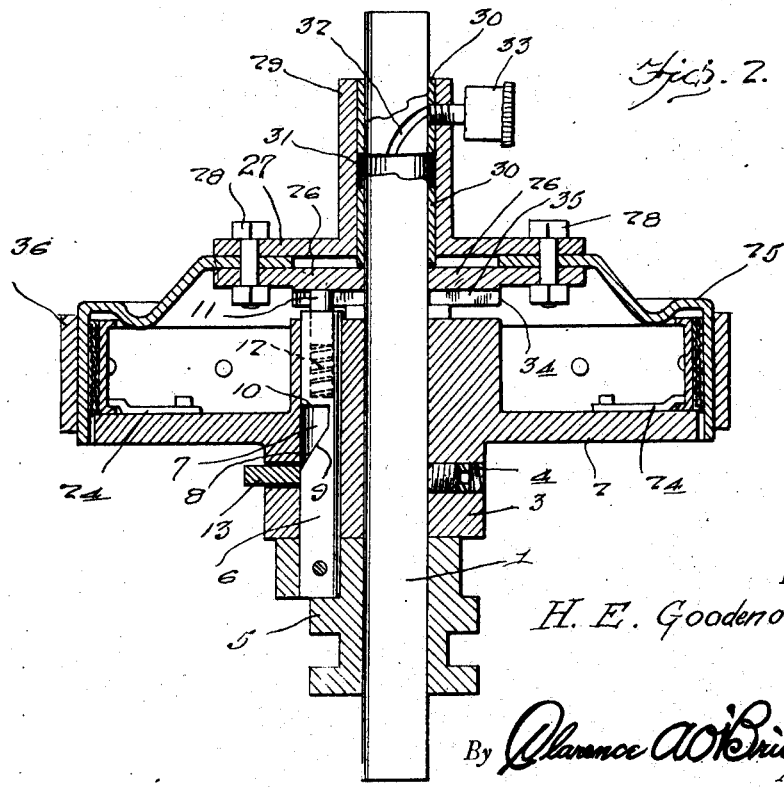
Fig. 2 is a sectional view taken on line 2—2 of Fig. 1, showing the parts in the clutch positioned with the clutch pin providing a rigid driving connection between the driving and driven members.

The driven shaft for the machine is indicated at 1, on which is mounted the driven mechanism including the disk 2 having the hub portion 3 formed with an axial bore receiving the shaft 1, and suitably locked thereon in any desired manner for rotation with said shaft, such as through the use of the locking bolts 4, shown in Fig. 2.

An operating collar 5 is slidably mounted on shaft 1 and is formed with a socket in which is secured the clutch operating pin 6 extending through the bore 7 in the hub portion 3 of the disk in spaced parallel relation to the shaft 1. This clutch pin 6 is provided in its central portion with a notch 8 having the angular surface 9 and the shouldered portion 10, while the free end of the pin is provided with a socket slidably receiving the pin 11 resiliently projected outwardly therefrom by the coiled spring 12 as shown in Fig. 2.

The hub portion 3 is slotted transversely through the portion formed with the bore 7 for receiving the operating lever 13 which is pivotally mounted on the disk 2 intermediate its ends as indicated at 14 in Fig. 1. One end of this lever operating in the slotted portion of the hub is adapted to move into the cutaway portion 8 of the clutch pin, and is adapted for operation by the inclined surface 9 thereof to produce through the foot extension 15 engaged with the set screw 16 carried by the arm 17 a rotation of the stub shaft 18.

This stub shaft is rotatably mounted in the peripheral portion of the disk and carries the arm 17 at one side thereof and the cam head 19 at the other side, which is engaged between the fingers 20 on the ends of the expansible clutch band 21, which is normally retained in contracted relation by the coiled springs 22, having the free ends engaged over the lugs 23 on the inside of the band. The band 21 is formed with inwardly extending flanges at the edges thereof and suitable guide fingers 24 are mounted on the disk 2 as shown in Figs. 2 and 3, for retaining the band in slidably engaged relation with the disk, but in no way interfering with its contractile and expansive operation.

The driving mechanism of the clutch includes the driving drum 25, which has the inner annular edge thereof engaged between the clutch plate 26 and the bearing member 27 and suitably rigidly locked therebetween in assembled relation by the bolts 28 extending through alined openings in these parts. The bearing member 27 carries in the sleeve portion 29, concentrically arranged with respect to the shaft 1, suitable bearing sleeves 30, having the inner ends in spaced relation to provide a lubricant receiving channel 31 while grooves 32 are formed in the faces of the sleeves engaged with the shaft 1, to permit the flow of lubrication along the shaft across the bearing faces of the sleeves.

The bearing member 27 and the outer sleeve 30 therein are provided with alined openings which communicate with the groove 32 for receiving the grease cup 33 adapted to form a lubricant supply means for the chamber 31 to efficiently lubricate the operation of the drum on the shaft.

Figure 4:
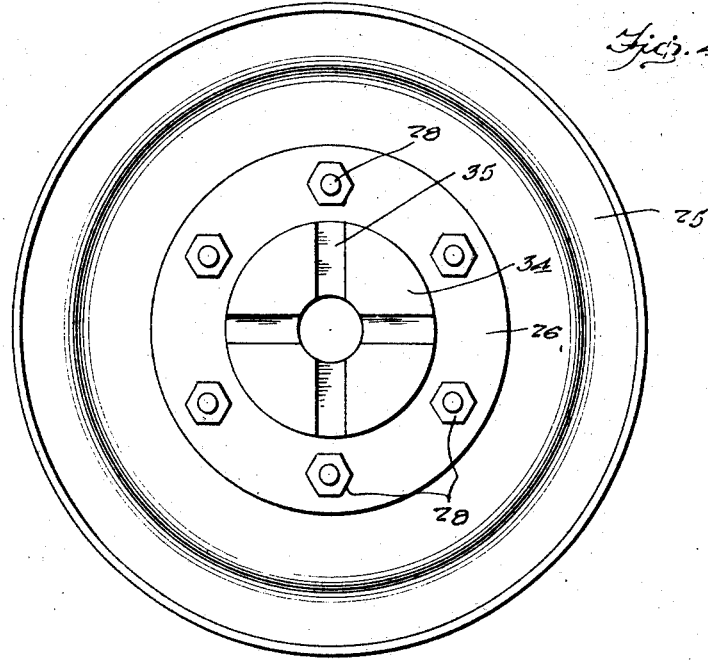
Fig. 4 is an inside view of the driving drum.

The clutch plate 26 is formed on the inner face with a projection 34 which is provided with a plurality of radial slots 35 arranged in diametrical relation at opposite sides of the shaft, and at relative right angles as clearly shown in Fig. 4, of a size to receive the spring pressed plunger 11 carried by the clutch pin 6.

In the operation of this clutch, the belt 36 operated by a suitable drive pulley on a main driving shaft or the like is applied to the outer surface of the drum 25 as shown in Figs. 1 and 2, so that the drum 25 is normally driven and provides a driving member or assembly for a machine on which the clutch is applied.

The shaft 1 forms a part of the machine and is the main driving shaft for the machine with the use of this clutch construction and the power is transmitted direct from the drum to the shaft through the operation of the clutch hub 3. A suitable operating mechanism may be connected to the operating collar 5, for controlling and moving the collar in any desired manner, so that in the position shown in Fig. 3, the clutch is in disengaged relation in order that no power will be transmitted to the shaft 1 from the drum 25.

In this relation of the parts, the drum is freely rotatable on shaft 1. To start the machine, the operating collar 5 is moved toward the hub portion 3 from the position shown in Fig. 3, to that shown in Fig. 2. In the first operation which takes place, the engagement of the inclined surface 9 of the clutch pin 6 with the lever 13, forces the same outwardly from the hub portion into the position shown in Fig. 2, before the pin 11 engages the projections on the clutch plate, as a result of which the rocking movement of lever 13 rotates the lever 17 and shaft 18 turning the cam 19 so as to separate the fingers 20 on the clutch band 21.

This expansion of the band 21, engages the inner face of the drum 25 and provides frictional driving contacts with said drum, as a result of which, slippage will occur between the drum and the shaft 1, which is taken up by the wear on the band, until the machine has had time to obtain a gradual increase in speed to that of the drum, so that the shaft in the drum rotates at substantially the same speed.

When this condition is reached, the further movement of the operating collar 5 toward the hub 3, into the position shown in Fig. 2, brings the spring pressed pin 11 into engagement with the projection 34 on the clutch plate so that a difference in movement between the disk and the drum will bring the pin into alinement with one of the grooves 35 as a result of which the spring 12 will project the pin into the groove and provide a rigid driving connection between the drum and the shaft thru the disk and the clutch pin, for the normal operation of the machine.

When it is desired to disengage the machine from the source of power to permit stopping of the same, the collar 5 is withdrawn from the position shown in Fig. 2 to that shown in Fig. 3, in which operation the lever 13 is operated on its pivot through the spring 22 normally forcing the fingers 20 toward each other which operates the cam 19 into the position shown in Fig. 5, and operates arm 17 in the direction of the arrow in Fig. 1, so as to move the opposite end of lever 13 into the slotted portion of the hub and the recessed portion of the clutch pin.

This provides a cooperation between the lever 13 and the clutch pin through engagement of the lever with the shoulder 10 on the pin for preventing withdrawal of the clutch key from the bore 7 in the hub, of the disk 2 and thereby limit the operation of the collar 5. The lever 13 therefore has a double purpose, serving to provide a control member for the operation of the clutch pin, as well as an operating lever for the clutch band.

The adjusting screw 16 provides a means for taking up wear in the clutch band. It will therefore be seen that a highly simple structure has been provided for obtaining a smooth starting and direct driving connection between a continuously driven drive shaft and an intermittently operated machine in which a special cooperation of the parts is obtained for carrying out the several features of the invention.

Having thus described my invention, what I claim as new is:—

1. A clutch comprising a shaft, a disk mounted on the shaft, an expansible friction band mounted on said disk, a drum rotatably mounted on said shaft over said band and disk, and adapted to be engaged with the band, a lever mounted on said disk for rocking movement in a plane at right angles to said shaft, and operable for expanding said band to engage the drum, a clutch pin slidably mounted in said disk in parallel spaced relation to the shaft and formed for engagement with said lever for operating the lever to expand the said band, said lever and pin cooperating to normally prevent withdrawal of the pin from the disk, and operating means for the pin.

2. A clutch, comprising a shaft, a disk member mounted on the shaft for rotation therewith, a driving drum rotatably mounted on the shaft adjacent said disk member and having radially formed slots provided therein, a friction clutch band mounted on said disk for expansion to engage said drum, an operating lever mounted on the disk, adapted for operation in one direction to expand said band to engage the drum, a clutch pin movably mounted in said disk, a resiliently projected pin mounted in the clutch pin for rigid clutching engagement with said slots formed in said drum, said pin being formed with a slot having an inclined surface and a shoulder therein for receiving said lever, the inclined surface being adapted to operate the lever for expanding said band, the shoulder and lever cooperating to normally prevent withdrawal of the clutch pin from the disk member.

In testimony whereof I affix my signature.

HARRY E. GOODENOW.